United States Patent Office 3,119,877
Patented Jan. 28, 1964

3,119,877
PREPARATION OF THIOETHERS
John Robert Campbell, Creve Coeur, and Roger E. Hatton, Kirkwood, Mo., assignors to Monsanto Chemical Company, St. Louis, Mo., a corporation of Delaware
No Drawing. Filed Sept. 24, 1962, Ser. No. 225,869
27 Claims. (Cl. 260—609)

This invention relates to a novel process for the preparation of thioethers (or sulfides) which consists of reacting, in certain solvents, an alkali metal mercaptide and a halogen-substituted compound.

In the prior art thioethers (or sulfides) have been prepared from alkali metal salts of mercaptans and activated alkyl or aryl halides with a copper catalyst or by the use of the lead, zinc or mercury salts of the mercaptan at extreme temperatures. In general the prior art procedures suffer from several disadvantages, among which are low yields, contaminated products and difficulty in carrying out the reaction.

It has now been found that aryl and alkyl thioethers can be readily prepared by a novel process which provides extremely high yields of easily obtained pure products. The process of this invention also avoids the need for using an activated halide, although such halides can be used, and allows the reaction to be readily and easily carried out at mild temperatures.

According to the process of this invention, thioethers are prepared by heating (a) a halogen-substituted compound which can be represented by the structural formula, $R(X)_n$, where R is a hydrocarbon radical, substituted hydrocarbon radical or a heterocyclic radical containing nitrogen and/or sulfur and carbon in the heterocyclic ring, X is a halogen selected from bromine, chlorine or iodine, and n is a whole number from 1 to 6 with (b) an alkali metal mercaptide which can be represented by the structure, R′SM, where R′ is a hydrocarbon radical and M is an alkali metal selected for sodium, potassium and lithium, in a solvent or mixture of solvents which boil above about 125° C. at 760 mm. of pressure and which contain the structure,

wherein there is no hydrogen bonded to the nitrogen atom.

Examples of solvents meeting the requirements specified are (a) the dialkyl alkyl amides, which can be represented by the structure

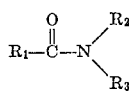

where $R_1$ is hydrogen or an alkyl radical of from 1 to 17 carbon atoms, and $R_2$ and $R_3$ are alkyl radicals of from 1 to 18 carbon atoms, examples of which are dimethylformamide, dimethylacetamide, diethylacetamide, dimethylpropionamide, dimethylbutyramide, diisopropylacetamide, dimethylcaproamide, dimethyllauramide, dimethylpalmitamide, dimethylstearamide, dicyclohexylformamide, dicyclohexylacetamide, methylethylformamide, methyloctadecylacetamide, and the like; and (b) the N-alkyl-2-pyrrolidones which can be represented by the structure

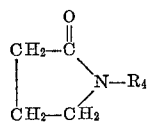

where $R_4$ is an alkyl radical of from 1 to 18 carbon atoms, examples of which are N-methyl-2-pyrrolidone, N-ethyl-2-pyrrolidone, N-propyl-2-pyrrolidone, N-octyl-2-pyrrolidone, N-octadecyl-2-pyrrolidone, and the like.

In many cases the sulfides prepared by the process of this invention can be readily converted to their sulfones by treating the sulfide with hydrogen peroxide or other suitable oxidizing agent.

The following non-limiting examples illustrate the process of this invention. Parts are parts by weight unless otherwise stated.

EXAMPLE 1

Into a suitable reaction vessel fitted with a reflux condenser and having means for the addition and removal of solids and liquids, means for the agitation of the vessel contents, means for heating the vessel contents, and means for measuring in the liquid and vapor phases, there were charged 19.6 parts of 86% potassium hydroxide, 33 parts of thiophenol, and 120 ml. of dimethylacetamide. The resulting mixture was heated, with agitation, to remove all the water present, leaving a solution of potassium thiophenolate in dimethylacetamide. To this mixture there were then charged 26.3 parts of m-dibromobenzene, and the resulting mixture was heated to and maintained at reflux, with agitation, for about 20 hours. Thereafter 200 ml. of 12% sodium hydroxide was added, resulting in the formation of an aqueous and an organic layer. The organic layer was separated, washed with water, and dried. Fractionation of the residue remaining gave 32.5 parts of a light yellow oil, m-bis(phenylmercapto)benzene, which had a boiling point of 174–181° C. at 0.3 mm. and an index of refraction, $n_D^{25°}$, of 1.6742.

EXAMPLE 2

Into a suitable reaction vessel there were charged 44 parts of thiophenol, 26 parts of 86% potassium hydroxide, and 150 ml. of dimethylacetamide, and the resulting mixture was heated to remove water. After cooling the solution of potassium thiophenolate in dimethylacetamide thus formed, there were charged 57.3 parts of bis(p-bromophenyl)ether. The resulting mixture was heated to about 165–170° C. and maintained within that temperature range, with agitation, for about 14 hours. The reaction mass was then allowed to cool to room temperature, and 200 ml. of 12½% sodium hydroxide was added. The organic material in the reaction mass was extracted with benzene, the benzene phase was washed with water, and the benzene was removed by evaporation. The residue remaining solidified and was crystallized from isopropyl alcohol and benzene, giving 47.3 parts of bis(p-phenylmercaptophenyl)ether, a white crystalline material melting at 82–84° C.

EXAMPLE 3

Into a suitable reaction vessel there were charged 55 parts of thiophenol, 32.6 parts of 86% potassium hydroxide, and 200 ml. of dimethylacetamide. The resulting mixture was heated, with agitation, to remove all the water present, leaving a solution of potassium thiophenolate in dimethylacetamide. To this mixture there were then charged 29.4 parts of m-dichlorobenzene, and the resulting mixture was heated to 165–170° C. and maintained within that temperature range, with agitation, for about 14 hours. Thereafter 200 ml. of 12% sodium hydroxide was added, resulting in the formation of an aqueous and an organic layer. The organic layer was separated, washed with water, and dried to leave a residue, which upon fractionation, gave 54.5 parts of m-bis(phenylmercapto)-benzene which had a boiling point of 173–183° C. at 0.45 mm. and an index of refraction, $n_D^{24°}$, of 1.6741.

Example 3 was repeated several times, except that in place of dimethylacetamide, other solvents were used. The results obtained are compared below.

| Solvent: | Yield in parts |
|---|---|
| N,N-dibutylacetamide | 51.8 |
| N,N-dimethylbutyramide | 47.6 |
| N-methyl-pyrrolidone | 55.5 |

EXAMPLE 4

Into a suitable reaction vessel there were charged 44 parts of thiophenol, 26 parts of 86% potassium hydroxide, and 150 ml. of dimethylacetamide. The resulting mixture was heated, with agitation, to remove all the water present, leaving a solution of potassium thiophenolate in dimethylacetamide. To this mixture there were then charged 36.3 parts of 2,5-dibromothiophene, and the resulting mixture was heated to 165–170° C. and maintained within that temperature range, with agitation, for about 13 hours. Thereafter 200 ml. of 12% sodium hydroxide was added, resulting in the formation of an aqueous and an organic layer. The organic layer was separated, washed with water, and dried to leave a residue, which, upon fractionation, gave 33.4 parts of a light yellow oil, 2,5-bis(phenylmercapto)thiophene, which had a boiling point of 189–195° C. at 0.5 mm.

EXAMPLE 5

Into a suitable reaction vessel there were charged 44 parts of thiophenol, 36 parts of 86% potassium hydroxide, and 150 parts of dimethylacetamide. The resulting mixture was heated, with agitation, to remove all the water present, leaving a solution of potassium thiophenolate in dimethylacetamide. To this mixture there were then charged 46.8 parts of 4,4'-dibromobiphenyl, and the resulting mixture was heated to 165–170° C. and maintained within that temperature range, with agitation, for about 13 hours. Thereafter 200 ml. of sodium hydroxide was added, resulting in the formation of an aqueous and an organic layer. The organic layer was separated, washed with water, and dried to leave a residue which, upon fractionation, gave 54.5 parts of 4,4'-bis(phenylmercapto)biphenyl which, after recrystallization, had a melting point of 120–121° C.

EXAMPLE 6

Into a suitable reaction vessel there were charged 11.2 parts of m-toluenethiol, 12.5 parts of m-bromotoluene, and 70 ml. of dimethylformamide.

After a solution of the materials charged was obtained, 3.6 parts of sodium hydroxide were charged and the reaction mass was agitated until all the sodium hydroxide had disappeared, showing completion of the formation of sodium m-tolylthiolate. The reaction mass was then heated to and maintained at reflux for about five hours, during which period there was a precipitation of sodium bromide. Thereafter the reaction mass was concentrated (by distillation) to a thick residue and then mixed with cold water.

The oil which separated as a result of the previous step was extracted with ether, and the ether solution was washed with water and dried. After evaporation of the ether, there remained bis-m-tolyl sulfide, a colorless oil having a boiling point of 114–116° C. at 0.3 mm. of mercury absolute.

EXAMPLE 7

Again following the procedure of Example 6, 23.0 parts of m-toluenethiol, 44.3 parts of 4-bromobiphenyl, 7.4 parts of sodium hydroxide, and 100 ml. of dimethylformamide were used to prepare biphenyl m-tolyl sulfide.

EXAMPLE 8

Into a suitable reaction vessel there were charged 49.8 parts of p-bromophenyl phenyl ether, 23.2 parts of thiophenol, and 100 ml. of dimethylformamide.

After a solution of the materials charged was obtained, 8.4 parts of sodium hydroxide were charged and the reaction mass was agitated until all the sodium hydroxide had disappeared, showing completion of the formation of sodium thiophenolate. The reaction mixture was then heated to and maintained at reflux for about five hours, during which period there was a precipitation of sodium bromide. Thereafter the reaction mixture was concentrated (by distillation) to a thick residue and then mixed with cold water.

The oil which separated as a result of the previous step was extracted with ether, and the ether solution was washed with water and dried. After evaporation of the ether, there remained p-phenoxyphenyl phenyl sulfide, a colorless oil having a boiling point of 172–177° C. at 0.5 mm. of mercury absolute, and an index of refraction, $n_D^{24°}$, of 1.6440.

In a similar manner o-phenoxyphenyl phenyl sulfide and m-phenoxyphenyl phenyl sulfide can be prepared.

EXAMPLE 9

Into a suitable reaction vessel there were charged 18.6 parts of p-toluenethiol, 24.2 parts of m-trifluoromethylphenyl bromide, and about 100 ml. of dimethylformamide. After a solution of the materials charged was obtained, 6 parts of sodium hydroxide were charged and the reaction mass was agitated until all the sodium hydroxide had disappeared, showing the formation of sodium p-tolylthiolate. The reaction mixture was then heated to and maintained at reflux (ca. 142° C.) for about five hours, during which period there was a precipitation of sodium bromide. Thereafter the reaction mass was concentrated (by distillation) to a thick residue and then mixed with cold water.

The oil which had separated as a result of the previous step was extracted with ether, and the ether solution was washed with water and dried. After evaporation of the ether there remained 27.8 parts of p-tolyl m-trifluoromethylphenyl sulfide, a colorless oil having a boiling point of 115° C. at 1.5 mm. of mercury absolute.

The sulfide prepared above was dissolved in about 100 ml. of acetic acid and about 60 ml. of 30% hydrogen peroxide was added, with slight heating, over a period of about thirty minutes. A white solid resulting from the above was separated, washed with water, and recrystallized from Skellysolve D to yield 40.6 parts of p-tolyl m-trifluoromethylphenyl sulfone, M.P. 80–81° C.

Following the procedure of Example 9, other m-trifluoromethylphenyl containing sulfides and sulfones can be prepared from appropriate sulfur containing compounds and trifluoromethylphenyl halides, selected examples of which are listed in the table below.

| Example No. | | Sulfide | | Sulfone | |
|---|---|---|---|---|---|
| | | M.P., ° C. or B.P., ° C. (mm.) | Color | M.P., ° C. | Color |
| 10 | Benzyl m-trifluoromethylphenyl | 92–100 (0.2) | Colorless | 82–83 | White. |
| 11 | Bis-m-trifluoromethylphenyl | 93–100 | do | 87–89 | Do. |
| 12 | m-Tolyl m-trifluoromethylphenyl | 99–100 (0.6) | do | 73–74 | Do. |
| 13 | o-Tolyl m-trifluoromethylphenyl | 94–95 (0.5) | do | 66–67 | Do. |
| 14 | p-Tert.-butylphenyl m-trifluoromethylphenyl | 119–123 (0.7) | do | 101–102 | Do. |
| 15 | Phenyl m-trifluoromethylphenyl | 146–158 (12–14) | do | 77–78 | Do. |
| 16 | p-Chlorophenyl m-trifluoromethylphenyl | 118–121 (1) | do | 61–63 | Do. |
| 17 | 2-naphthyl m-trifluoromethylphenyl | 65–66 | Lt. yellow | 104–105 | Tan. |
| 18 | Cyclohexyl m-trifluoromethylphenyl | 135–140 (8) | Colorless | 84–85 | White. |

In addition to the above other alkyl phenyl m-trifluoromethylphenyl sulfides and sulfones can be prepared as above, e.g., xylyl m-trifluoromethylphenyl sulfide and sulfone, octylphenyl m-trifluoromethylphenyl sulfide and sulfone, nonylphenyl m-trifluoromethylphenyl sulfide and sulfone, dodecylphenyl m-trifluoromethylphenyl sulfide and sulfone, other halophenyl m-fluoromethylphenyl sulfides and sulfones, e.g., o-chlorophenyl m-trifluoromethylphenyl sulfide and sulfone, m-chlorophenyl m-trifluoromethylphenyl sulfide and sulfone, p-fluorophenyl m-trifluoromethylphenyl sulfide and sulfone, o-bromophenyl m-trifluoromethylphenyl sulfide and sulfone, p-iodophenyl m-trifluoromethylphenyl sulfide and sulfone; and other cycloalkyl m-trifluoromethylphenyl sulfides and sulfones, e.g., cyclopentyl m-trifluoromethylphenyl sulfide and sulfone.

EXAMPLE 19

In the manner of the previous examples, there were charged to a suitable reaction vessel 52.7 parts of 85% potassium hydroxide, 163.5 parts of 1-dodecanethiol, and 300 ml. of dimethylacetamide. The resulting mixture was heated, with agitation, to remove all water present, leaving a solution of potassium thiododecanoate in dimethylacetamide. To this mixture there were then chargd 71.2 parts of m-dibromobenzene and the resulting mixture was heated to and maintained at reflux, with agitation, for sufficient time to complete the reaction. Thereafter about 250 ml. of 12% sodium hydroxide was added, resulting in the formation of an aqueous and an organic layer. The organic layer was separated, washed with water, and dried. Upon recrystallization from isopropanol, there were obtained 85 parts of m-bis(dodecylmercapto)benzene, an off-white solid, melting point 34–35° C.

EXAMPLE 20

In a suitable reaction vessel a Grignard reagent was prepared from 63.4 parts of m-chlorophenyl phenyl sulfide and 7.8 parts of magnesium using tetrahydrofuran as the reaction medium. After cooling the Grignard in an ice bath 9.2 parts of sulfur was charged at a rate which did not cause the temperature of the reaction mass to exceed about 35° C.

Then, after removing the tetrahydrofuran ether, water and finally hydrochloric acid were added. The organic layer and an ether extract of the aqueous layer were then combined and washed with sodium hydroxide. The caustic layer was then washed with ether and acidified to release the mercaptan. The mercaptan was then separated with the aid of ether and salt water, dried and distilled to give m-phenylmercaptobenzenethiol, a colorless oil, having a boiling point of 127–138° C. at 0.35 mm. of mercury and an index of refraction, $n_D^{25}$, of 1.6705.

Into a suitable reaction vessel there were charged 62.2 parts of m-phenylmercaptobenzenethiol, 18.3 parts of 87% potassium hydroxide, 250 ml. of dimethylacetamide and 50 parts of m-chlorophenyl phenyl sulfide. The resulting mixture was then heated at about 145–150° C. for one and one-half days. The organic material was isolated in the usual way and distilled to give bis(m-phenylmercaptophenyl)sulfide, a yellow oil having a boiling point of 252–265° C. at 0.25 mm. of mercury.

EXAMPLE 21

In the manner of Example 20, 50 parts of m-phenylmercaptobenzenethiol, 14.7 parts of 87% potassium hydroxide and 15.3 parts of m-dichlorobenzene in 200 ml. of dimethylacetamide were reacted to prepare m-bis(m-phenylmercaptophenylmercapto)benzene, an orange oil having a boiling point of 300–308° C. at 0.18 mm. of mercury.

EXAMPLE 22

Following the procedure of Example 1, 18.7 parts of m-toluenethiol, 30.3 parts of m-nitrobromobenzene, 6 parts of sodium hydroxide and 125 ml. of dimethylformamide were used to prepare m-nitrophenyl m-tolyl sulfide.

In the same manner other nitrophenyl tolyl sulfides can be prepared.

Following the process of this invention as illustrated by the above examples, other thioethers were prepared, examples of which are set forth in the table below.

| Ex. No. | Reactants | | Product | Boiling or Melting Point, °C. |
|---|---|---|---|---|
| | Thiophenol | Halide | | |
| 23 | Thiophenol | 1-methyl-2-bromo-4-isopropylbenzene. | 2-methyl-5-isopropylphenyl phenyl sulfide. | 115–120(0.3). |
| 24 | ___do___ | 2-chloro-pyridine. | 2-phenylmercaptopyridine. | 107–110(0.3). |
| 25 | ___do___ | 3,5-dichloropyridine. | 3,5-bis(phenylmercapto)-pyridine. | 51–52. |
| 26 | p-Tert.-butyl-thiophenol. | m-Dichlorobenzene. | m-Di-(p-tert.-butylphenylmercapto)-benzene. | 210–237 (0.55). |
| 27 | Thiophenol | Bromobenzene | Diphenyl sulfide. | 113–183(30.) |
| 28 | ___do___ | Iodobenzene | ___do___ | 113–183(30). |
| 29 | ___do___ | 1-bromo-3,4-dimethyl benzene. | (3,4-dimethylphenylmercapto)-benzene. | 117–120 (0.45). |

Because of their low cost and ready availability a particularly desirable halogen-substituted hydrocarbon which can be used in the process of this invention is chlorinated biphenyl containing from about 20% to about 60% by weight of combined chlorine. Chlorinated biphenyl within this preferred range is commercially available as products containing about 21%, 32%, 42%, 48%, 54% or 60% by weight combined chlorine corresponding approximately to mono-, di-, tri-, tetra-, penta-, and hexachlorobiphenyl, respectively. Examples of the use of chlorinated biphenyl in the method of this invention are given below.

EXAMPLE 30

In the manner of previous examples, 55 parts of benzenethiol, 32.6 parts of 85% potassium hydroxide, 62.2 parts of chlorinated biphenyl having a chlorine content of about 32% by weight were reacted in 200 ml. of dimethylacetamide to provide 34.6 parts of viscous mixed poly(phenylmercapto)biphenyls, having a boiling range of 250–295° C. at 0.35 mm. of mercury and 35.6 parts of a mixture of mono(phenylmercapto)biphenyl and other (phenylmercapto)chlorobiphenyls, having a boiling range of 185–210° C. at 0.35 mm.

EXAMPLE 31

In the manner of previous examples, 55 parts of benzenethiol, 32.6 parts of 85% potassium hydroxide and 56.6 parts of chlorinated biphenyl having a chlorine content of about 21% by weight were reacted in 200 ml. of dimethylacetamide to provide two distinct products, the first of which, a light yellow oil, had a boiling range of 146–196° C. at 0.25 mm. while the second, a viscous yellow oil, had a boiling range of 212–250° C. at 0.25 mm.

It is to be noted that it is preferred to conduct the process of this invention under substantially dry conditions in order to obtain the maximum yield. However, the presence of water, even in substantial amounts, does not render the process inoperative. Also, the use of potassium salts is preferred since such salts are generally more soluble in the solvents used, thus tending to reduce reaction times.

Further examples of hydrocarbon radicals, R', which, with the attached SM group, constitute the alkali metal mercaptides useful in the process of this invention are the various alkylphenyl radicals, such as cresyl, xylyl, mesityl, ethylphenyl, diethylphenyl, isopropylphenyl, n-propylphenyl, n-butylphenyl, isobutylphenyl, tert.-amylphenyl, caprylphenyl, di-tert.-butylphenyl, diisobutylphenyl, nonylphenyl, decylphenyl, laurylphenyl, tridecylphenyl, stearylphenyl, wax-substituted phenyl, cyclohexylphenyl, hydroxyphenyl, methoxyphenyl, ethoxyphenyl, propoxyphenyl, butoxyphenyl, hexoxyphenyl, decoxyphenyl, stearoxyphenyl, phenylmercaptophenyl, dihydroxyphenyl, dimethoxyphenyl, nitrophenyl, xenyl, chloroxenyl, dichloroxenyl, chloronaphthyl, anthracyl, phenanthryl, methylisopropyl phenanthryl, hydroxyphenanthryl, methoxyhydroxyphenyl, methylchlorophenyl, ethylchlorophenyl, cyclopentyl, 1,4-dimethylcyclohexyl, methylcyclopentyl, isopropylcyclohexyl, diisobutylcyclohexyl, methyl, ethyl, propyl (n- and iso-), butyl (n-, sec.-, iso-, and tert.-), amyl (n-, sec.-, iso-, and tert.-), n-hexyl, sec.-hexyl, 2,2 - dimethyl - 3 - butyl, 2;2-dimethyl-4-butyl, 2,3-dimethyl-2-butyl, 2-methyl - 1 - pentyl, 2-methyl-2-pentyl, 3-methyl-1-pentyl, 3-methyl-2-pentyl, n-heptyl, sec.-heptyl, 2,3-dimethyl - 3 - pentyl, 2,4-dimethyl-2-pentyl, 2,4-dimethyl-3-pentyl, 2,2,3-trimethyl-3-butyl, 3-ethyl-2-pentyl, 2-methyl-2-hexyl, n-octyl, 2-ethyl-hexyl, diisobutyl, capryl, di-iso-butylcarbinyl, n-nonyl, n-decyl, lauryl, tridecyl, myristyl, cetyl, stearyl, eicosyl, and the like.

With regard to the halogen-substituted compound, $R(X)_n$, further examples of radicals which R can be are xylyl, xylylene, mesityl, ethylphenyl, ethylphenylene, n-propylphenylene, isopropylphenyl, n-propylphenyl, n-butylphenyl, tert.-butylphenylene, amylphenyl, diisopropylphenyl, caprylphenylene, octylphenyl, nonylphenyl, decylphenyl, laurylphenyl, laurylphenylene, tridecylphenyl, hexadecylphenyl, stearylphenyl, wax phenyl, methylphenylene, hydroxyphenylene, hydroxyphenyl, methylhydroxyphenyl, methylhydroxyphenylene, butoxyphenyl, lauroxyphenyl, lauroxyphenylene, methylmethoxyphenyl, ethylmethoxyphenyl, ethylchlorophenyl, isopropylchlorophenylene, phenylmercaptophenyl, phenyloxyphenyl, phenanthryl, a n t h r y l, methylisopropylphenanthryl, chloronaphthyl, benzohydryl, biphenylyl, biphenylene, and the like. Additionally, halides such as the mono- and di-halonaphthalenes, mono- and di-halobenzophenones, halobenzylhalides, halothiophenes, halophenothiazines, halopyrazines, halopyrroles, halopyrimidines, haloquinolines, haloisoquinolines, halobenzothiazoles, halobenzoimidazoles, and the like, can be used.

The compounds of this invention are useful as functional fluids, even at high temperatures of the order of 700° F., which are used as force transmission fluids for the transmission of pressure, power or torque in fluid pressure or torque actuated mechanisms, such as for example, the "hydraulic fluids" for transmitting fluid pressure to the ram cylinders of hydraulic presses or in devices for the absorption and dissipation of energy such as shock absorbers or recoil mechanisms, or for transmission of torque through torque converter types of fluid couplings. The functional fluids of this invention may also be used as damping fluids which are the liquid compositions used for damping mechanical vibrations or resisting other rapid mechanical movements. The functional fluids of this invention are also suitable for use as synthetic lubricants between relatively moving mechanical parts, as bases for synthetic greases and as the liquid material in the filters of air conditioning systems. When used as functional fluids our compounds can be used per se or they can be used in combination with various addition agents, such as oxidation inhibitors, rust inhibitors, anti-foaming agents, detergents, viscosity index improvers compatible therewith, etc., whenever specific uses require such addition agents. In some cases the compounds of the invention are solids at room temperature and accordingly are suitable as functional fluids at temperatures above their melting point.

Many of the compounds of this invention, specifically the m-trifluoromethylphenyl containing compounds, are also useful in effecting the destruction of plants and the selective control and inhibition of plant growth. More particularly our compounds are useful as herbicides in controlling the growth of grasses, especially in corn fields, since no noticeable adverse affect on the growth of corn has been observed.

For use as a herbicide our compounds should be applied in an amount sufficient to exert the desired herbicidal action. However the amount of said compounds present in compositions as actually applied for preventing the growth of weeds, i.e. undesired plants, will vary with the manner of application, the particular weeds for which the control is sought, etc. In general, herbicidal compositions containing as applied from about 0.5% to about 95% by weight of our compounds are suitable for most applications.

Desirable herbicidal effects can be obtained by the application of small amounts, e.g. one-half pound, of compounds of the invention, although it may be necessary or desirable to use applications as high as 50 pounds per acre. For general application as a pre-emergence herbicide amounts in the range of 1-25 pounds per acre can be used, greater selectivity being obtained at the lower concentrations.

Herbicidal compositions can be prepared by admixing our compounds in herbicidally effective amounts with an inert carrier to provide formulations adapted for ready and efficient application to soil, using conventional applicator equipment. Thus, the herbicidal compositions or formulations can be prepared in the form of solids or liquids. Solid compositions are preferably in the form of dusts and are compounded to give homogeneous, free-flowing dusts by admixing the compound with finely-divided inert carriers such as talcs, clays, lime, bentonite, pumice, fuller's earth, pyrophyllite, diatomaceous earth, or flours such as walnut shell, wheat, redwood, soya bean, cottonseed flours and other inert solid materials of the kind conventionally employed in preparing herbicidal compositions in dusts or powdered form. On the other hand such inert carriers can be impregnated with our compounds by means of a volatile solvent. These carriers or diluents can represent a substantial portion, for example, 50 to 98 percent by weight of the entire formulation as applied.

Liquid compositions of the invention can be prepared by admixing our compounds with a suitable liquid inert carrier or diluent. With certain solvents, such as alkylated naphthalene, methyl isobutyl ketone, methyl ethyl ketone, dimethyl formamide, hydrocarbons, e.g. kerosene, xylene, and cresol, high concentrations of the active ingredient can be obtained in solution. The proportions of such organic liquid additive depend upon the solubility of the active ingredient and may require as little as one percent or as much as 90 percent or more in order to provide a uniformly distributed formulation.

The herbicidal compositions of the invention, whether in the form of dusts or liquids, preferably include also an organic surfactant of the kind sometimes referred to in the art as a wetting, dispersing, or emulsifying agent. These surfactants have several functions, such as causing the compositions to be easily dispersed in water to give aqueous sprays which, for the most part, constitute desirable media for most applications, or help in wetting the surfaces of the undesired plants to which a formulation is applied.

The organic surfactants employed can be of the anionic, cationic, or nonionic type. Generally, the surfactants will only be a minor proportion of the formulation as used, for example, less than 15 percent and frequently as low as 0.05 percent by weight of the composition. Usually concentrations of from 0.5 to 5 percent are found to be optimum.

The herbicidal effects which can be obtained by use of the compound of this invention are exemplified by utilization of the following test procedure.

Pre-Emergence Test

Seeds of twelve different plants each representing a principal botanical type are planted in aluminum pans (9½" x 5¼" x 2¾"). A good grade of top soil which has been treated with 0.05% of a soil conditioner (Krilium) and screened through ½ inch wire mesh, is compacted to a depth of ⅜" from the top of the pan. The grass seeds are scattered randomly over one-half of the soil surface and the broadleaf seeds are scattered randomly over the remaining soil surface. The seeds are covered with ⅜" of the prepared soil mixture and the pan leveled.

The pan is next sprayed with 15 cc. of an organic solvent containing the unknown chemical to be tested. The initial test rate is an amount equivalent to 25 lbs. per acre. If results warrant, the compound is retested at lower rates per acre until the threshold toxicity level is determined.

An aqueous emulsion of the test compound can be prepared by first dissolving 0.5 gm. in 25 cc. of acetone or other suitable solvent. An aliquot of this stock solution (depending upon rate desired) is pipetted into an atomizer vial and 0.2 cc. of a 3:1 cyclohexanone-emulsifier mixture is added thereto. The resulting solution is then diluted to 15 cc. with water to form a useable emulsion.

After spraying, the pans are placed in ½" of water and allowed to absorb moisture through perforations in the bottom until the soil surface is about one-half moist. The pans are then transferred to a wet sand bench in a greenhouse.

Fourteen days after application of the test chemical, the results are observed and recorded. The number of plants of each species which germinated and grew are counted and converted to a herbicidal rating by means of a fixed scale based on average percent germination. (Germination rates are established for all new seed lots and periodic checks run on old seed in current use.) The scale use is as follows:

HERBICIDAL RATINGS—CONVERSION SCALE

| Percent Germination—Control | 3 | 2 | 1 | 0 |
|---|---|---|---|---|
| 100 | 0–5 | 6–10 | 11–15 | 16–20 |
| 90 | 0–5 | 6–9 | 10–13 | 14–20 |
| 80 | 0–4 | 5–8 | 9–12 | 13–20 |
| 70 | 0–4 | 5–7 | 8–11 | 12–20 |
| 60 | 0–3 | 4–6 | 7–9 | 10–20 |
| 50 | 0–3 | 4–5 | 6–8 | 9–20 |
| 40 | 0–2 | 3–4 | 5–6 | 7–20 |
| Corn | 0–1 | 2 | 3 | 4–5 |

The relative value of each compound with respect to its herbicidal effect on each plant is indicated by a number as follows:

0 ............................................ No phytotoxicity.
1 ............................................ Slight phytotoxicity.
2 ............................................ Moderate phytotoxicity.
3 ............................................ Severe phytotoxicity.

In the following table of herbicidal evaluation data the plants are represented by letters as follows:

| Code | Plant Name | Plant Family | Genus | Species |
|---|---|---|---|---|
| A | Wild Oat | Gramineae | Avena | fatua. |
| B | Rye Grass | do | Lolium | perenne. |
| C | Wild Buckwheat | Polygonaceae | Polygonum | convolvulus. |
| D | Radish | Cruciferae | Raphanas | sativus. |
| E | Sugar Beet | Chenopodiaceae | Beta | vulgaris. |
| F | Cotton | Malvaceae | Gossypium | herbaceum |
| G | Corn | Gramineae | Zea | mays. |
| H | Foxtail | do | Setaria | faberii. |
| I | Barnyard | do | Echinochloa | crusgalli. |
| J | Crab Grass | do | Digitaria | sanguinalis. |
| K | Field Bindweed | Convolvulaceae | Convolvulus | arvensis. |
| L | Pigweed | Armaranthaceae | Amaranthus | retroflexus. |

Utilizing our compounds in the above described test procedure, the following results were observed:

| Compound | Rate, lbs./acre | A | B | C | D | E | F | G | H | I | J | K | L |
|---|---|---|---|---|---|---|---|---|---|---|---|---|---|
| Benzyl m-trifluoromethylphenyl sulfone | 25 | 3 | 1 | 2 | 0 | 0 | 0 | 0 | 3 | 2 | 3 | 1 | 2 |
| Do | 5 | 0 | 0 | 2 | 0 | 0 | 0 | 0 | 3 | 3 | 3 | 0 | 1 |
| Do | 2 | 0 | 0 | 0 | 0 | 0 | 0 | 0 | 2 | 3 | 3 | 0 | 0 |
| p-Chlorophenyl m-trifluoromethylphenyl sulfone | 25 | 0 | 3 | 2 | 0 | 2 | 2 | 0 | 3 | 2 | 3 | 0 | 3 |
| Do | 5 | 0 | 0 | 0 | 0 | 0 | 0 | 0 | 1 | 2 | 3 | 0 | 1 |
| Bis-m-trifluoromethylphenyl sulfone | 25 | 2 | 0 | 1 | 1 | 0 | 0 | 0 | 2 | 0 | 0 | 0 | 3 |
| o-Tolyl m-trifluoromethylphenyl sulfone | 25 | 3 | 0 | 1 | 0 | 0 | 0 | 0 | 2 | 0 | 1 | 0 | 2 |

As can be seen from the above the compounds of this invention have fairly broad activity at higher concentrations, are more selective at the lower concentrations and are not harmful to corn at any of the concentrations tested. Thus our compounds can be used to control the growth of a wide variety of plants depending upon the concentration at which they are used.

Herbicidal compositions employing our compounds can be applied to the soil by methods used in the art for pre-emergence control which include spraying a cultivated field, injecting a liquid formulation in a furrow by means of a suitable jet following a plow or harrowing device, dusting a field with a solid formulation before the field is plowed or any other suitable means whereby substantial uniform distribution of the herbicidal agent can be effected.

Both the solid and the liquid formulations described herein are useful in herbicidal applications of our compounds because they facilitate the uniform distribution of said compounds and aid in the control of undesirable plants by maintaining the active ingredient in a form which enables its prompt assimilation by the plant and the efficient utilization of its weed destroying properties. The described agents also enable the proper use of our compounds to achieve the desired herbicidal effect by an unskilled operator without elaborate equipment.

Fertilizer materials, other herbicidal and other pest control agents, such as fungicides and insecticides, can, of course, be included in the herbicidal compositions of the invention if desired.

Other modes of applying the principles of this invention will be apparent to those skilled in the art. Accordingly, while this invention has been described with reference to various specific examples and embodiments, it is understood that the invention is not limited to such examples and that it can be variously practiced within the scope of the following claims.

This application is a continuation-in-part of application Serial No. 202,956, filed June 18, 1962, which in turn is a continuation-in-part of application Serial No. 161,422, filed December 22, 1961; application Serial No. 69,559, filed November 16, 1960; application Serial No. 69,574, filed November 16, 1960; and application Serial No.

What is claimed is:
1. A compound of the structure

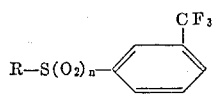

where n is a whole number from 0 to 1 and when n is 0 R is selected from the group consisting of phenyl alkylphenyl radicals having up to 12 carbon atoms in the alkyl portions thereof and trifluoromethylphenyl, halophenyl, naphthyl, benzyl and cycloalkyl radicals of 5 to 6 carbon atoms and when n is 1 R is selected from the group consisting of trifluoromethylphenyl, halophenyl, naphthyl, benzyl and cycloalkyl radicals of 5 to 6 carbon atoms.
2. p-Chlorophenyl m-trifluoromethylphenyl sulfide.
3. Benzyl m-trifluoromethylphenyl sulfide.
4. Bis-m-trifluoromethylphenyl sulfide.
5. o-Tolyl m-trifluoromethylphenyl sulfide.
6. Cyclohexyl m-trifluoromethylphenyl sulfide.
7. A compound of the structure

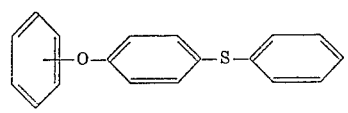

8. m-Phenoxyphenyl phenyl sulfide.
9. A process for preparing thioethers comprising reacting
  (a) a halogen-substituted compound represented by the structural formula, $R(X)_n$, where R is selected from the group consisting of
    (i) hydrocarbon radicals from olefinic and acetylenic unsaturation,
    (ii) non-hydrocarbon substituted aromatic hydrocarbon radicals where the non-hydrocarbon substituents are selected from the group consisting of phenoxy, phenylmercapto, nitro, halogen, haloalkyl, alkoxy and sulfonate, and
    (iii) heterocyclic radicals where the hetero atoms are selected from the group consisting of nitrogen and sulfur, X is a halogen selected from the groups consisting of bromine, chlorine, and iodine, and n is a whole number from 1 to 6, with
  (b) an alkali metal mercaptide represented by the structural formula R'SM, where R' is a hydrocarcarbon radical free from olefinic and acetylenic unsaturation and M is an alkali metal selected from the group consisting of lithium, potassium, and sodium,
  (c) in a solvent selected from the group consisting of dialkyl alkyl carboxamides represented by the structure

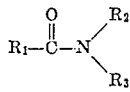

and N-alkyl-2-pyrrolidones represented by the structure

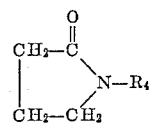

where $R_1$ is selected from the group consisting of hydrogen and alkyl radicals of from 1 to 18 carbon atoms, and $R_2$, $R_3$ and $R_4$ are alkyl radicals of from 1 to 18 carbon atoms.
10. A process for preparing thioethers comprising reacting.
  (a) a halogen-substituted compound represented by the structural formula $R(X)_n$, where R is a hydrocarbon radical free from olefinic and acetylenic unsaturation, X is a halogen selected from the group consisting of bromine, chlorine, and iodine, and n is a whole number from 1 to 6, with
  (b) an alkali metal mercaptide represented by the structural formula R'SM, where R' is an aromatic hydrocarbon radical and M is an alkali metal selected from the group consisting of lithium, potassium, and sodium,
  (c) in a solvent selected from the group consisting of dialkyl alkyl carboxamides represented by the structure

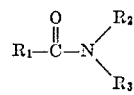

and N-alkyl-2-pyrrolidones represented by the structure

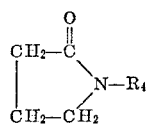

where $R_1$ is selected from the group consisting of hydrogen and alkyl radicals of from 1 to 18 carbon atoms, and $R_2$, $R_3$ and $R_4$ are alkyl radicals of from 1 to 18 carbon atoms.
11. A process for preparing thioethers comprising reacting
  (a) a halogen-substituted compound represented by the structural formula $R(X)_n$, where R is a non-hydrocarbon substituted aromatic hydrocarbon radical where the non-hydrocarbon substituents are selected from the group consisting of phenoxy, phenylmercapto, nitro, halogen, haloalkyl, alkoxy and sulfonate, X is a halogen selected from the group consisting of bromine, chlorine and iodine, and n is a whole number from 1 to 6, with
  (b) an alkali metal mercaptide represented by the structural formula R'SM, where R' is an aromatic hydrocarbon radical and M is an alkali metal selected from the group consisting of lithium, potassium and sodium.
  (c) in a solvent selected from the group consisting of dialkyl alkyl carboxamides represented by the structure

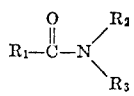

and N-alkyl-2-pyrrolidones represented by the structure

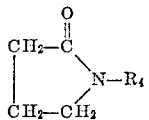

where $R_1$ is selected from the group consisting of hydrogen and alkyl radicals of from 1 to 18 carbon atoms, and $R_2$, $R_3$ and $R_4$ are alkyl radicals of from 1 to 18 carbon atoms.
12. A process for preparing thioethers comprising reacting
  (a) a halogen-substituted compound represented by the structural formula $R(X)_n$, where R is a heterocyclic radical where the hetero atoms are selected from the group consisting of nitrogen and sulfur, X is a halogen selected from the group consisting of bromine, chlorine and iodine, and n is a whole number from 1 to 6, with
  (b) an alkali metal mercaptide represented by the structural formula R'SM, where R' is an aromatic hydrocarbon radical and M is an alkali metal selected from the group consisting of lithium, potassium and sodium, (c) in a solvent selected from the group consisting of dialkyl alkyl carboxamides represented by the structure

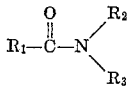

and N-alkyl-2-pyrrolidones represented by the structure

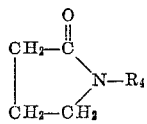

where $R_1$ is selected from the group consisting of hydrogen and alkyl radicals of from 1 to 18 carbon atoms, and $R_2$, $R_3$ and $R_4$ are alkyl radicals of from 1 to 18 carbon atoms.

13. A process for preparing diphenyl sulfide comprising reacting
    (a) chlorobenzene with
    (b) sodium thiophenolate
    (c) in a solvent selected from the group consisting of dialkyl alkyl carboxamides represented by the structure

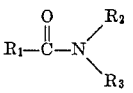

and N-alkyl-2-pyrrolidones represented by the structure

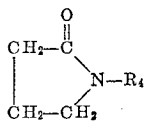

where $R_1$ is selected from the group consisting of hydrogen and alkyl radicals of from 1 to 18 carbon atoms, and $R_2$, $R_3$ and $R_4$ are alkyl radicals of from 1 to 18 carbon atoms.

14. A process for preparing a bis(phenylmercapto)benzene comprising reacting
    (a) a dihalobenzene, where the halogen is selected from the group consisting of bromine, chlorine, and iodine, with
    (b) an alkali metal thiophenolate, where the alkali metal is selected from the group consisting of lithium, potassium and sodium,
    (c) in dimethylacetamide.

15. A process for preparing a bis(phenylmercapto)benzene comprising reacting
    (a) a dihalobenzene, where the halogen is selected from the group consisting of bromine, chlorine, and iodine, with
    (b) an alkali metal thiophenolate, where the alkali metal is selected from the group consisting of lithium, potassium and sodium,
    (c) in a solvent selected from the group consisting of dialkyl alkyl carboxamides represented by the structure

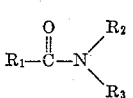

and N-alkyl-2-pyrrolidones represented by the structure

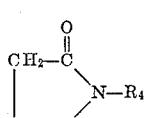

where $R_1$ is selected from the group consisting of hydrogen and alkyl radicals of from 1 to 18 carbon atoms, and $R_2$, $R_3$ and $R_4$ are alkyl radicals of from 1 to 18 carbon atoms.

16. A process for preparing a bis(phenylmercapto)benzene comprising reacting
    (a) a dihalobenzene, where the halogen is selected from the group consisting of bromine, chlorine, and iodine, with
    (b) an alkali metal thiophenolate, where the alkali metal is selected from the group consisting of lithium, potassium and sodium,
    (c) in N-methyl-2-pyrrolidone.

17. A process for preparing a bis(phenylmercaptophenyl) sulfide comprising reacting
    (a) a halophenyl phenyl sulfide, where the halogen is selected from the group consisting of bromine, chlorine and iodine, with
    (b) an alkali metal phenylmercaptothiophenolate, where the alkali metal is selected from lithium, potasisum and sodium,
    (c) in a solvent selected from the group consisting of dialkyl alkyl carboxamides represented by the structure

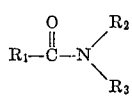

and N-alkyl-2-pyrrolidones represented by the structure

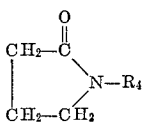

where $R_1$ is selected from the group consisting of hydrogen and alkyl radicals of from 1 to 18 carbon atoms, and $R_2$, $R_3$ and $R_4$ are alkyl radicals of from 1 to 18 carbon atoms.

18. A process for preparing a bis(phenylmercaptophenylmercapto)benzene comprising reacting
    (a) a dihalobenzene, where the halogen is selected from the group consisting of bromine, chlorine and iodine, with
    (b) potassium phenylmercaptothiophenolate,
    (c) in a solvent selected from the group consisting of dialkyl alkyl carboxamides represented by the structure

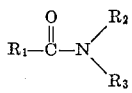

and N-alkyl-2-pyrrolidones represented by the structure

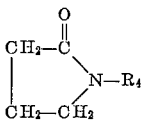

where $R_1$ is selected from the group consisting of hydrogen and alkyl radicals of from 1 to 18 carbon atoms, and $R_2$, $R_3$ and $R_4$ are alkyl radicals of from 1 to 18 carbon atoms.

19. A process for preparing a bis(alkylmercapto)benzene comprising reacting
    (a) a dihalobenzene, where the halogen is selected from the group consisting of bromine, chlorine, and iodine, with
    (b) an alkali metal alkylthiolate, where the alkali metal is selected from the group consisting of lithium, potassium and sodium,
    (c) in a solvent selected from the group consisting of dialkyl alkyl carboxamides represented by the structure

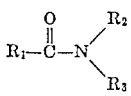

and N-alkyl-2-pyrrolidones represented by the structure

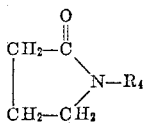

where $R_1$ is selected from the group consisting of hydrogen and alkyl radicals of from 1 to 18 carbon atoms, and $R_2$, $R_3$ and $R_4$ are alkyl radicals of from 1 to 18 carbon atoms.

20. A process for preparing a bis(alkylphenylmercapto)benzene comprising reacting
(a) a dihalobenzene, where the halogen is selected from the group consisting of bromine, chlorine, and iodine, with
(b) an alkali metal alkylthiophenolate, where the alkali metal is selected from the group consisting of lithium, potassium and sodium,
(c) in a solvent selected from the group consisting of dialkyl alkyl carboxamides represented by the structure

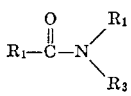

and N-alkyl-2-pyrrolidones represented by the structure

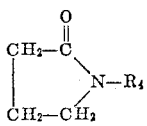

where $R_1$ is selected from the group consisting of hydrogen and alkyl radicals of from 1 to 18 carbon atoms, and $R_2$, $R_3$ and $R_4$ are alkyl radicals of from 1 to 18 carbon atoms.

21. A process for preparing a bis(phenylmercapto)biphenyl which comprises reacting
(a) a bis(halobiphenyl), where the halogen is selected from the group consisting of bromine, chlorine and iodine, with
(b) an alkali metal thiophenolate, where the alkali metal is selected from the group consisting of lithium, potassium and sodium,
(c) in dimethylacetamide.

22. A process for preparing a bis(phenylmercapto)biphenyl which comprises reacting
(a) a bis(halobiphenyl), where the halogen is selected from the group consisting of bromine, chlorine and iodine, with
(b) an alkali metal thiophenolate, where the alkali metal is selected from the group consisting of lithium, potassium and sodium,
(c) in a solvent selected from the group consisting of dialkyl alkyl carboxamides represented by the structure

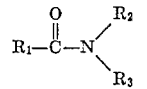

an N-alkyl-2-pyrrolidones represented by the structure

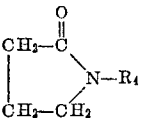

where $R_1$ is selected from the group consisting of hydrogen and alkyl radicals of from 1 to 18 carbon atoms, and $R_2$, $R_3$ and $R_4$ are alkyl radicals of from 1 to 18 carbon atoms.

23. A process for preparing a phenoxyphenyl phenyl sulfide comprising reacting
(a) a halophenyl phenyl ether, where the halogen is selected from the group consisting of bromine, chlorine and iodine, with
(b) an alkali metal thiophenolate, where the alkali metal is selected from the group consisting of lithium, potassium and sodium,
(c) in a solvent selected from the group consisting of dialkyl alkyl carboxamides represented by the structure

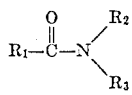

and N-alkyl-2-pyrrolidones represented by the structure

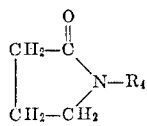

where $R_1$ is selected from the group consisting of hydrogen and alkyl radicals of from 1 to 18 carbon atoms, and $R_2$, $R_3$ and $R_4$ are alkyl radicals of from 1 to 18 carbon atoms.

24. A process for preparing a bis(phenylmercaptophenyl)ether which comprises reacting
(a) a bis(halophenyl)ether, where the halogen is selected from the group consisting of bromine, chlorine and iodine, with
(b) an alkali metal thiophenolate, where the alkali metal is selected from the group consisting of lithium, potassium and sodium,
(c) in dimethylacetamide.

25. A process for preparing a bis(phenylmercaptophenyl)ether which comprises reacting
(a) a bis(halophenyl)ether, where the halogen is selected from the group consisting of bromine, chlorine and iodine, with
(b) an alkali metal thiophenolate, where the alkali metal is selected from the group consisting of lithium, potassium and sodium,
(c) in a solvent selected from the group consisting of dialkyl alkyl carboxamides represented by the structure

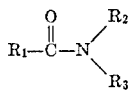

and N-alkyl-2-pyrrolidones represented by the structure

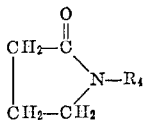

where $R_1$ is selected from the group consisting of hydrogen and alkyl radicals of from 1 to 18 carbon atoms, and $R_2$, $R_3$ and $R_4$ are alkyl radicals of from 1 to 18 carbon atoms.

26. A process for preparing thioethers comprising reacting
(a) a chlorinated biphenyl containing from about 20% to about 60% by weight combined chlorine, with
(b) an alkali metal mercaptide represented by the structural formula R'SM, where R' is a hydrocarbon radical free from olefinic and acetylenic unsaturation and M is selected from the group consisting of lithium, potassium and sodium.

(c) in a solvent selected from the group consisting of dialkyl alkyl carboxamides represented by the structure

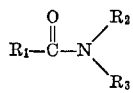

and N-alkyl-2-pyrrolidones represented by the structure

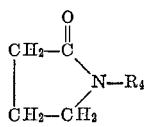

where $R_1$ is selected from the group consisting of hydrogen and alkyl radicals of from 1 to 18 carbon atoms, and $R_2$, $R_3$ and $R_4$ are alkyl radicals of from 1 to 18 carbon atoms.

27. A process for preparing thioethers comprising reacting
 (a) a chlorinated biphenyl containing from about 20% to about 60% by weight combined chlorine, with
 (b) an alkali metal thiophenolate, where the alkali metal is selected from the group consisting of lithium, potassium and sodium,
 (c) in dimethylacetamide.

References Cited in the file of this patent

UNITED STATES PATENTS 3,053,901    Uhlenbroek _____ Sept. 11, 1962

OTHER REFERENCES

Stacy et al.: J. Org. Chem. 24, 1892–1896 (1959).
Gilman et al.: J. Am. Chem. Soc. 69, 2053–2057 (1947).